United States Patent Office 3,567,656
Patented Mar. 2, 1971

3,567,656
PREPARATION OF A CATALYTIC COMPOSITE
CONTAINING A GERMANIUM COMPONENT
Roy T. Mitsche, Island Lake, Ill., assignor to Universal
 Oil Products Company, Des Plaines, Ill.
No Drawing. Filed May 28, 1969, Ser. No. 828,716
Int. Cl. B01j 11/08, 11/22
U.S. Cl. 252—466                                11 Claims

ABSTRACT OF THE DISCLOSURE

A germanium component is uniformly dispersed throughout a porous, high surface area carrier material by the steps of: first, reducing germanium dioxide with hydrogen; second, dissolving the resulting reduced material in an aqueous solution of chlorine to form a solution thereof; third, impregnating a high surface area, porous carrier material with the resulting solution; and, finally, drying and calcining the resulting impregnated carrier material. Key feature of this method of preparation involves the use of this solution of the reduced germanium compound in chlorine water to impregnate the carrier material, thereby achieving uniform dispersion of the germanium component in the carrier material.

---

The subject of the present invention is, broadly, a method of preparing a catalytic composite comprising a germanium component uniformly dispersed throughout a porous, high surface area carrier material. In a narrower aspect, the present invention concerns a method of preparation of a catalytic composite comprising a platinum group component, a germanium component, and a chlorine component with a porous, high surface area carrier material wherein a high dispersion of both the platinum group component and the germanium component is achieved.

In the art of preparing catalytic composites, it is typically required that a catalytically active component be combined with a carrier material or support material which may or may not be active for the particular reaction or set of reactions of interest. It is often additionally required that the catalytically active component be uniformly dispersed or distributed throughout the carrier material. The expression "uniformly dispersed" is generally understood to mean that the concentration of the particular component in the carrier material is approximately the same in any divisible portion thereof. This expression is typically employed to distinguish the situation encountered when the catalytically active component is concentrated in a particular area of the composite; for example, some catalytic composites of the prior art employ so-called surface impregnation techniques to achieve a high concentration of the catalytically active component on the surface of the carrier material with relatively little of the component penetrating to the inner areas of the carrier material. Heretofore, catalysts for use in the hydrocarbon conversion art have been relatively simple formulations typically involving 1 or more catalytically active elements from Group VIII or Group VI-B of the Periodic Table combined with a carrier material.

Responsive to the ever-increasing demands of petroleum refining technologists for the increased efficiency in their catalytic conversion processes, the catalyst formulation art has turned to multi-component catalytic composites involving some rather unusual catalytic components. One of these components is a germanium component. Germanium is an element of Group IV-A of the Periodic Table which has relatively unusual chemical characteristics because it is in the same family as carbon and silicon, which are non-metals, and tin and lead, which are metals. When an attempt is made to combine a germanium component with a high surface area carrier material via a standard impregnation procedure, substantially difficulty is typically encountered because of the lack of readily available, soluble, and decomposable germanium compounds. The prior art has, in the main, utilized germanium tetrachloride dispersed in a strong solution of hydrochloric acid in water to combine a germanium component with a carrier material. This procedure is, undoubtedly, quite acceptable when it is desired to prepare a catalytic composite having a high concentration of germanium on the surface of the carrier material and when the carrier material is resistant to attack by the concentrated acid. However, it has been recently determined that a superior catalytic composite can be obtained by uniformly distributing a germanium component throughout a carrier material and combining it with a platinum group component and a halogen component to form a hydrocarbon conversion catalyst having unusual capabilities of activity, selectivity, and stability when employed in conventional processes such as reforming, hydrocracking, isomerization, and the like processes which have traditionally utilized dual-function catalytic composites.

The problem with the use of this germanium tetrachloride solution is that the germanium tetrachloride tends to rapidly hydrolyze to germanium oxide on contact with moisture or with the carrier material with resultant precipitation of solid germanium dioxide on the surface of the carrier material. Moreover, in many cases the acidity of this solution causes substantial damage to the carrier material. Therefore, attempts at the utilization of a solution of germanium tetrachloride to achieve an intimate dispersion of a germanium component and a carrier material have been unsuccessful and have resulte din composites containing extremely high local concentrations of germanium. In some cases, the germanium component can be redistributed in the composite by a heat treatment above 710° C., but this procedure typically can result in an unacceptable, marked decrease in the surface area of the composite.

I have now found a method for uniformly distributing a germanium component on a porous carrier material, and my method involves the use of a material prepared by the reduction of germanium dioxide with hydrogen to form a solid gray material which is believed to be primarily nascent elemental germanium possibly admixed with some germanium mono-oxide. Despite the teaching of the chemistry art that elemental germanium is relatively insoluble in mineral acids and only readily dissolves in aqua regia and hot sulfuric acid, I have determined, quite unexpectedly, that the material resulting from the reduction step readily dissolves in chlorine water to form an impregnation solution. The resulting impregnation solution can then be utilized to achieve a uniform dispersion of a germanium component in a porous high surface area carrier material as will be explained hereinafter.

Accordingly, it is an object of the present invention to provide a method of uniformly distributing a germanium component throughout a porous, high surface area carrier material. Another object is to provide a method of uniformly distributing a germanium component throughout a porous, high surface area carrier material without resorting to excessively high heat treatments to redistribute the germanium crystallites. Yet another object is to provide a method of impregnating an alumina carrier material with a germanium component without damaging the alumina.

In one embodiment, the present invention is a method of preparing a catalytic composite comprising a geranium component uniformly dispersed throughout a porous, high surface area carrier material. In the first step of the method, germanium dioxide is subjected to contact with hydrogen at reduction conditions including a temperature of about 500 to about 850° C. selected to form a solid gray material which is believed to be nascent elemental germanium. The resulting solid material is thereafter dissolved in an aqueous solution of chlorine. In the next step, a high surface area porous carrier material is contacted with the resulting solution at impregnation conditions. Finally, the impregnated carrier material is dried and calcined to produce a catalytic composite having a germanium component uniformly distributed throughout the carrier material.

In a preferred embodiment, the present invention concerns a method of preparing a catalytic composite comprising a combination of a platinum group component, a germanium component, and a chlorine component with a porous, high surface area carrier material. In the first step germanium dioxide is subjected to contact with hydrogen at reduction conditions selected to form the solid gray material. Thereafter, the solid material is dissolved in an aqueous solution of chlorine to form a solution thereof. The germanium solution is then admixed with a soluble, decomposable compound of a platinum group metal. The resulting mixture is then contacted with a high surface area porous carrier material at impregnation conditions. Thereafter, the impregnated carrier material is dried and calcined to produce a catalytic composite having a platinum group component and a germanium component uniformly distributed therein.

Other objects and embodiments of the present invention relate to details regarding the preferred ingredients of the catlytic composite prepared thereby, the conditions and preferred procedures used in each step thereof, and preferred uses for the resulting catalytic composite. These will be hereinafter described in the following detailed explanation of each of these facets of the present invention.

As indicated above, the first essential step of the present invention involves reducing germanium dioxide with hydrogen. The germanium dioxide utilized is preferably in a finely divided state, and good results are typically obtained with a powdered material passing through a sieve of about 100 to about 200 U.S. standard sieve size number. This finely divided material is contacted with substantially pure hydrogen stream at a critical elevated temperature. More specifically, I have found that the temperature utilized in this reduction step is the most important factor governing ability of the resulting material to dissolve in chlorine water. I prefer to utilize temperatures in the range of about 500 to about 850° C. with best results obtained at about 650° C. Below the lower end of this temperature range, I have encountered substantial difficulty in attempting to dissolve the reduced material in chlorine water; in fact, visual observation indicated a substantial portion of the reduced material was re-oxidized to the dioxide on contact with the chlorine solution. Likewise, above the upper limit of this temperature range, the resulting reduced material is refractory and substantially insoluble in chlorine water. Ordinarily, this step is completed when the original white solid dioxide material has changed to a grayish-black material; this ordinarily requires about 0.5 to about 5 hours with excellent results obtained in about 2 hours. The material produced by this reduction step is characterized herein as nascent germanium material with perhaps a trace amount of germanium monoxide.

After the reduction step the resultant solid material is dissolved in an aqueous solution throughout which chlorine gas is bubbled. In general, the dissolution of this material requires vigorous agitation for a period of about 1 to about 4 hours or more. As indicated above, the rate of dissolution of this material is a pronounced function of the temperature utilized in the reduction step.

Following the dissolution of the material in the chlorine solution, the resulting solution is contacted with a high surface area, porous carrier material in an impregnation step. The carrier material is a porous, adsorptive, high surface area support having a surface area of about 25 to about 200 m.$^2$/gm. Suitable materials are: (1) activated carbon, coke, or charcoal; (2) silica or silica gel, clays and silicates including those synthetically prepared and naturally occurring, which may or may not be acid treated; for example, attapulgus clay, china clay, diatomaceous earth, fuller's earth, kaolin, kielselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica - zirconia, etc.; (5) crystalline aluminosilicates such as naturally occurring or synthetically prepared mordenite and/or faujasite, either in the hydrogen form or in a form which has been treated with multivalent cations; and (6) combinations of these groups. The preferred porous carrier materials for use in the present invention are refractory inorganic oxides with best results obtained with an alumina carrier material. Suitable alumina materials are the crystalline aluminas known as the gamma-, eta-, and theta-alumina with gamma- or eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.30 to about 0.70 gm./cc. and surface area characteristics such that the average pore diameter is about 20 to 300 angstroms, the pore volume is about 0.10 to about 1.0 ml./gm., and the surface area is about 100 to about 500 m.$^2$/gm. In general, best results are typically obtained with a gamma-alumina carrier material which is used in the form of spherical particles having: a relatively small diameter (i.e., typically about $\frac{1}{16}$ inch), an apparent bulk density of about 0.5 gm./cc., a pore volume of about 0.4 ml./gm., and a surface area of about 175 m.$^2$/gm.

The conditions utilized in this impregnation step are the conventional conditions known in the art and generally involve a temperature of about 50 to about 100° F. and a contact time of about 0.25 to about 0.5, or more, hours. It is a good practice to vigorously agitate the mixture of carrier material and impregnation solution in order to effect intimate contact therebetween. Similarly, it is preferred to adjust the pH of the impregnation solution to the range of about 1 to about 7 by adding a relatively strong, decomposable acid such as hydrochloric acid and/ or nitric acid, and to dilute the impregnation solution to a volume which is substantially in excess with the volume of the carrier material which is impregnated. It is preferred to use a ratio of impregnation solution to carrier material of at least 1.5:1 and preferably about 2:1 to about 10:1 or more. The carrier material is preferably utilized in a relatively small size in order to promote good contact with the impregnation solution, with best results typically obtained with $\frac{1}{16}$ spherical particles.

As indicated above, in a preferred embodiment the catalytic composite prepared by the method of the present invention is combined with a platinum group component to form a novel dual-function catalytic composite which finds utility in processes such as isomerization, hydroisomerization, dehydroisomerization, desulfurization, denitrogenation, hydrogenation, alkylation, dealkylation, disproportionation, oligomerization, hydration, transalkylation, cyclization, dehydrocyclization, condensation, cracking, hydrocracking, reforming, and the like processes. The platinum group component may be added to the composite in a number of different ways. For example, the high surface area carrier material utilized in the germanium impregnation step described above may already contain a uniform dispersion of a platinum group component which was incorporated in this carrier material according to any of the techniques taught in the art such as coprecipitation, ion exchange, or impregnation. Similarly, the platinum group component can be added to the germanium impregnated carrier material in a separate impregnation step after, before, or during the subsequent calcination step which will be described hereinafter. In general, I have found best results when the platinum group component is impregnated simultaneously with the germanium component. Thus, the platinum group component is preferably added to the composite by mixing the chlorine solution containing dissolved germanium with a soluble, decomposable compound of a platinum group metal. Generally, best results are obtained with an aqueous solution of chloroplatinic acid although other water-soluble compounds of platinum group metals may be utilized in this impregnation solution and include chloroplatinate, bromoplatinic acid, platinum dichloride, platinum tetrachloride hydrate, platinum dichlorocarbonyldichloride, dinitrodiaminoplatinum, etc.

Although the platinum group component of the subject composite is preferably platinum, the scope of the present invention is intended to include other platinum group metals such as palladium, rhodium, ruthenium, osmium, and iridium. The platinum group component may exist within the final catalyst composite as a compound such as an oxide, sulfide, halide, etc., or as an elemental metal, with the latter state being preferred. The amount of the platinum group component present in the final composite is generally quite small and typically comprises about 0.01 to about 2.0 wt. percent of the final composite, calculated on an elemental basis. Excellent results are obtained when the catalyst contains about 0.05 to about 1.0 wt. percent of the platinum group metal.

In addition to the platinum group component, it is preferred that the composite prepared by the method of the present invention also contain a halogen component. Although the precise form of the chemistry of the association of the halogen component with the carrier material and/or other components of the composite is not entirely known, it is customary in the art to refer to the halogen component as being combined with the carrier material or other ingredients of the catalytic composite. This combined chloride may be either fluorine, chlorine, iodine, bromine, or mixtures thereof. Of these the chlorine is particularly preferred especially in view of the fact that the germanium impregnation solution inherently contains substantial amounts of chlorine and/or chloride. The halogen component may be added to the carrier material in any suitable manner either during preparation of the carrier material or before or after the addition of the other catalytic components. Despite the fact that the germanium impregnation solution contains substantial amounts of chlorine and/or chloride, it is generally preferred to add additional hydrogen chloride to the mixture of the germanium impregnation solution and the soluble decomposable compound of a platinum group metal. The halogen component is combined with the carrier material in amounts sufficient to result in the final composite containing about 0.5 to about 3.5 wt. percent, and preferably about 0.6 to about 1.2 wt. percent of halogen, calculated on an elemental basis.

The halogen component is utilized in the subject composite for two purposes: one involves the traditional enhancement of the acidic function of the resulting composite; the other involves the adjustment and maintenance of a uniform distribution of the germanium component in the carrier material. One of the principal effects of incorporating the halogen component in the composite is that it acts to hold or fix the germanium component in a highly dispersed state where it is resistant to the subsequent reduction conditions. A preferred mode of operation when the high surface area carrier material is alumina is to add hydrochloric acid to the germanium impregnation solution in an amount corresponding to about 0.5 to about 4 wt. percent of the alumina which is to be impregnated.

In summary, a preferred embodiment of the impregnation step of the present invention involves the utilization of a mixture prepared by admixing the chlorine water containing the dissolved germanium material with a soluble, decomposable compound of a platinum group metal, such as chloroplatinic acid, and with hydrochloric acid. The amounts of the ingredients present in this impregnation solution are selected to result in a final catalytic composite containing the desired quantity of the components. These final quantities were previously specified with respect to the halogen component and the platinum group component. Regarding the germanium component, it is preferably sufficient to constitute about 0.01 to about 5.0 wt. percent of the final composite, calculated on an elemental basis. In an embodiment wherein the subject composite is utilized to reform a hydrocarbon distillate boiling in the gasoline range, best results are obtained with about 0.05 to about 2.0 wt. percent germanium.

Regardless of the details of how the components of the catalyst are combined with the porous carrier material, the final catalysts are combined with the porous carrier material, the final catalyst generally will be dried at a temperature of about 200 to about 600° F. for a period of from about 2 to about 24 hours or more. and finally calcined at a temperature of about 700° F. to about 1100° F. in an air atmosphere for a period of about 0.5 to about 10 hours in order to convert the metallic components substantially to the oxide form. Best results are generally obtained when the halogen content of the catalyst is adjusted during the calcination step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.6 to about 1.2 wt. percent.

It is preferred that the resultant calcined catalytic composite be subjected to a substantially water-free reduction step prior to its use in the conversion of hydrocarbons. This step is designed to insure a uniform and finely divided dispersion of the metallic component throughout the carrier material. Preferably, substantially pure and dry hydrogen (i.e., less than 20 vol. p.p.m. $H_2O$) is used as the reducing agent in this step. The reducing agent is contacted with the calcined catalyst at conditions including a temperature of about 800° F. to about 1000° F. selected to reduce the platinum group component to the metallic state while maintaining the germanium component in an oxidized state. This reduction step may be performed in situ as part of a start-up sequence if precautions are taken to predry the plant to a substantially water-free state and if substantially water-free hydrogen is used. The duration of this step is preferably less than two hours, and, more typically, about one hour.

The resulting reduced catalytic composite may, in some cases, be beneficially subjected to a presulfiding step designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1000° F. It is generally a good practice to per-form this presulfiding step under substantially water-free conditions.

The resulting catalytic composite finds utility in the broad range of hydrocarbon conversion reactions which have traditionally utilized dual-function hydrocarbon conversion catalysts. Suitable charge stocks, reaction conditions, methods of use, and mechanics of use for all of these hydrocarbon conversion processes are well known to those skilled in the art and will not be repeated here. It is sufficient to note that the catalytic composite prepared by the method of the present invention can be utilized in the conversion of hydrocarbons according to the methods and techniques well known to those skilled in the art.

The following example is given to illustrate further the preparation of a preferred catalytic composite by the method of the present invention. It is understood that this example is given for the sole purpose of illustration and is not to be considered to limit unduly the broad scope and spirit of the appended claims.

EXAMPLE

An alumina carrier material comprising 1/16 inch spheres was prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of alumina hydrogel. The resulting hydrogel particles were then aged and washed with an ammoniacal solution and finally dried and calcined at an elevated temperature to form spherical particles of gamma-alumina containing about 0.3 wt. percent combined chloride. Additional details as to this method of preparing the preferred carrier material are given in the teachings of U.S. Pat. No. 2,620,314.

Germanium dioxide powder in an amount of 2.0 gms. was loaded into a porcelain boat and subjected to contact with substantially pure hydrogen at a temperature of 650° C. for about 2 hours. The resulting grayish-black solid material was weighed and found to comprise 1.39 gms. which stoichiometrically corresponds to the elemental metal.

The resulting material was then dissolved in an aqueous solution through which chlorine was continuously being bubbled at a rate sufficient to maintain the solution in a saturated state. The solution was stirred wih a magnetic stirrer and the solid completely dissolved after about 2 hours. The resulting germanium solution was then mixed with sufficient chloroplatinic acid to result in a final composite containing 0.375 wt. percent platinum. In addition, hydrogen chloride was added to the resulting mixture in an amount corresponding to about 2 wt. percent of the alumina carrier material which was subsequently impregnated.

Thereafter, the particles of the alumina carrier material were contacted with the resulting impregnation mixture with constant agitation. The volume of the impregnation solution was approximately two times the volume of the alumina particles utilized. The impregnation mixture was maintained in contact with the alumina particles for a period of about ½ hour at a temperature of about 70° F. Thereafter, the temperature of the mixture of alumina particles and impregnation solution was raised to about 300° F. and the excess solution was evaporated. This drying step took about 1 hour. The resulting dried particles were then subjected to a calcination treatment in an air atomsphere at about 975° F. for about 1 hour. The calcined spheres were then contacted with an air stream containing $H_2O$ and HCl in a mole ratio of about 40:1 for about 4 hours at 975° F. in order to adjust the halogen content of the composite to a value of about 0.90 wt. percent.

A portion of the resulting catalyst particles was then analyzed and found to contain, on an elemental basis, about 0.375 wt. percent platinum, about 0.25 wt. percent germanium, and about 0.85 wt. percent chloride. The analysis also showed both the germanium and platinum components to be uniformly distributed on the catalyst particles; that is, the concentration of these materials at the center of the particles was substantially the same as that measured at the surface of these particles.

Thereafter, the catalyst particles were subjected to a dry pre-reduction treatment by contacting them with a substantially pure hydrogen stream containing less than 20 vol. p.p.m. $H_2O$ at a temperature of about 1000° F., a pressure slightly above atmospheric and a flow rate of the hydrogen stream through the catalyst particles corresponding to a gas hourly space velocity of about 720 hr.$^{-1}$. This pre-reduction step was for a duration of about 1 hour.

The resulting catalytic composite was found to have remarkable properties of activity, selectivity, and stability when it was utilized in the conversion of hydrocarbons. In particular, it was found to give superior results when it was utilized in a process for reforming a gasoline fraction at high severity conditions including a relatively low pressure of 50 to about 350 p.s.i.g.

I claim as my invention:

1. A method of preparing a catalytic composite comprising a germanium component uniformly dispersed throughout a porous, high surface area carrier material, said method comprising the steps of:
   (a) subjecting germanium dioxide to contact with hydrogen at reduction conditions including a temperature of about 500 to about 850° C. selected to form a solid gray material;
   (b) dissolving the resulting solid material in an aqueous solution of chlorine to form a solution thereof;
   (c) contacting a high surface area, porous carrier material with the resulting solution at impregnation conditions; and, thereafter,
   (d) drying and calcining the resulting impregnated carrier material to produce a catalytic composite having a germanium component uniformly distributed throughout the carrier material.

2. A method as defined in claim 1 wherein said porous, high surface area carrier material is a refractory inorganic oxide.

3. A method as defined in claim 2 wherein said refractory inorganic oxide is alumina.

4. A method as defined in claim 3 wherein hydrochloric acid is added to the solution formed in step (b) in an amount corresponding to about 0.5 to about 4 wt. percent of the alumina which is impregnated in step (c).

5. A method of preparing a catalytic composite comprising a combination of a platinum group component, a germanium component, and a chlorine component with a porous, high surface area carrier material, the composite having the germanium component and the platinum component uniformly dispersed therein, said method comprising the steps of:
   (a) subjecting germanium dioxide to contact with hydrogen at reduction conditions including a temperature of about 500° C. to about 850° C., selected to form a solid, gray material;
   (b) dissolving the resulting solid material in an aqueous solution of chlorine to form a solution thereof;
   (c) mixing the solution from step (b) with a soluble, decomposable compound of a platinum group metal;
   (d) contacting a high surface area, porous carrier material with the mixture from step (c) at impregnation conditions; and, thereafter,
   (e) drying and calcining the resulting impregnated carrier material to produce a catalytic composite having a platinum group component and a germanium component uniformly distributed therein.

6. A method as defined in claim 5 wherein said porous, high surface area carrier material is a refractory inorganic oxide.

7. A method as defined in claim 6 wherein said refractory inorganic oxide is alumina.

8. A method as defined in claim 5 wherein the catalytic composite resulting therefrom is subjected to contact with a hydrogen stream at reduction conditions selected to reduce the platinum group component while maintaining the germanium component in an oxidation state above that of the elemental metal to produce a catalytic composite comprising a combination of a platinum group metal, germanium oxide and chlorine with a porous, high surface area carrier material.

9. A method as defined in claim 5 wherein said platinum group component of the composite is platinum or a compound of platinum, and the compound utilized in step (c) is a soluble, decomposable compound of platinum.

10. A method as defined in claim 9 wherein said soluble, decomposable compound of platinum is chloroplatinic acid.

11. A method as defined in claim 5 wherein said porous, high surface area carrier material is alumina, and wherein hydrochloric acid is added to the mixture formed in step (c) in an amount corresponding to about 0.5 to about 4 wt. percent of the alumina.

References Cited
UNITED STATES PATENTS

| | | | |
|---|---|---|---|
| 2,784,147 | 3/1957 | Strecker | 196—50 |
| 2,796,410 | 6/1957 | Strecker | 252—465 |
| 2,906,701 | 9/1959 | Stink | 208—138 |
| 3,359,214 | 12/1967 | Aftandilian | 252—431 |

DANIEL E. WYMAN, Primary Examiner

P. M. FRENCH, Assistant Examiner

U.S. Cl. X.R.

252—163, 442; 208—138